United States Patent [19]

Tachibana

[11] Patent Number: 5,485,285
[45] Date of Patent: Jan. 16, 1996

[54] IMAGE RECORDING APPARATUS

[75] Inventor: Shunichi Tachibana, Urayasu, Japan

[73] Assignee: Canon Kabushiki Kaisha, Tokyo, Japan

[21] Appl. No.: 276,499

[22] Filed: Jul. 18, 1994

Related U.S. Application Data

[63] Continuation of Ser. No. 97,374, Jul. 27, 1993, abandoned.

[30] Foreign Application Priority Data

Jul. 28, 1992 [JP] Japan .................................. 4-201160
Jul. 9, 1993 [JP] Japan .................................. 5-170026

[51] Int. Cl.$^6$ ................................................ H04N 1/21
[52] U.S. Cl. ............................................... 358/296
[58] Field of Search ................................. 358/296, 298, 358/300, 302; 395/118, 145; 346/1.1, 107 R, 108, 160, 76 L; 347/240, 251, 131

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,723,129 | 2/1988 | Endo et al. | 346/1.1 |
| 4,740,796 | 4/1988 | Endo et al. | 346/1.1 |
| 4,777,651 | 10/1988 | McCann et al. | 382/21 |
| 5,132,711 | 7/1992 | Shinada et al. | 346/140 |
| 5,175,566 | 12/1992 | Ejiri et al. | 346/140 |
| 5,229,792 | 7/1993 | Ono et al. | 346/140 |
| 5,270,827 | 12/1993 | Kobayashi et al. | 358/298 |

FOREIGN PATENT DOCUMENTS

| | | |
|---|---|---|
| 59-123670 | 7/1984 | Japan . |
| 59-138461 | 8/1984 | Japan . |

*Primary Examiner*—Mark J. Reinhart
*Attorney, Agent, or Firm*—Fitzpatrick, Cella, Harper & Scinto

[57] ABSTRACT

Image data are read out line by line from an image memory which store received image data. The read out image data are decoded, and upon removing an isolation point, developed into a line of original data. It is determined whether the developed line of original data are involved in only white information. If it is determined that the data are involved in all white information, a number of continuous line involved in all white information are counted. A recording sheet is transferred by the counted number corresponding to form a white area. Subsequently, a scan of data top of which is involved in a line including black information are generated and transmitted to a recording unit. Specifically, to send a scan of data referenced above to the recording unit, data involved in white information at both the start and end sides of the scan are cut.

56 Claims, 9 Drawing Sheets

FIG. 2
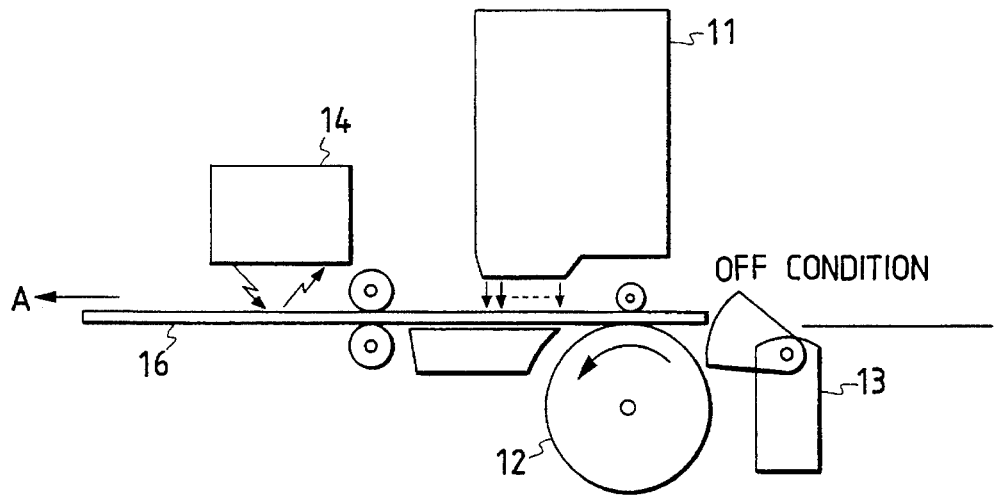
FIG. 3
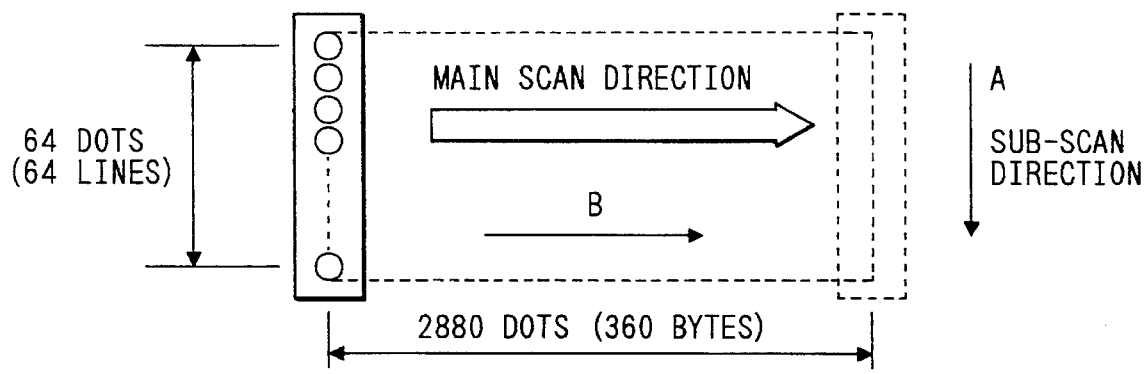
FIG. 4
| $A_{0,0}$ | $A_{0,1}$ | $A_{0,2}$ | ------------- | $A_{0,359}$ |
|---|---|---|---|---|
| $A_{1,0}$ | $A_{1,1}$ | $A_{1,2}$ | | $A_{1,359}$ |
| ⋮ | ⋮ | ⋮ | | |
| $A_{63,0}$ | $A_{63,1}$ | $A_{63,2}$ | ------------- | $A_{63,359}$ |
$A_{ij}$ : 1 BYTE DATA (8 DOTS)

IMAGE RECORDING APPARATUS

This application is a continuation of application Ser. No. 08/097,374 filed Jul. 27, 1993, now abandoned.

BACKGROUND OF THE INVENTION

1. Field of the Invention

The present invention relates to an image recording apparatus for recording an image on a recording material in accordance with image data.

2. Related Background Art

Hitherto, there is known at image recording apparatus, such as a facsimile apparatus, in which for example, image data is produced by decoding encoded data stored in an image memory. All of the produced image data are transferred to a recording unit, without regard to the presence or absence of black information in the image data. A record processing is effected in accordance with the thus transferred image data.

However, according to the recording scheme by the above mentioned conventional image recording apparatus, if a printer unit used as the recording unit is such an inexpensive printer that a considerable time is required for image processing, a recording speed will slow down.

For example, in a case where there is used a printer unit provided with a recording head having a plurality of dot recording means arranged in a vertical direction, the recording head being scanned in a horizontal direction (main scan direction) while a recording sheet being fed in a vertical direction (sub-scan direction) for the recording, implementation of the recording process in spite of the fact that the whole one scan of data indicate white-information means that the recording head is scanned for recording white data alone. That is, the useless scanning operation is carried out, and thus this needs useless processing time. Particularly, it is significant for a facsimile apparatus or the like to reduce time for the recording process from such a view point that occurrence of lack of image memories for storing the received image data is avoided.

SUMMARY OF THE INVENTION

It is an object of the present invention to provide an improved image recording apparatus in light of the above problems.

It is another object of the present invention to provide an image recording apparatus capable of enhancing the recording processing speed.

It is still another object of the present invention to provide an image recording apparatus capable of reducing a processing amount of data in a recording unit.

It is still another object of the present invention to provide an image recording apparatus capable of enhancing the recording processing speed by means of performing the sub-scan for a white line area including no black-information, without performing the recording processing.

It is still another object of the present invention to provide an image recording apparatus in which for a white area consisting of lines having only white-information, a feed processing such as feeding of a recording medium is carried out to form images and an image and in which for a line including black-information and, if necessary, the successive line, recording data an amount of which is required for one time of recording scan are formed and the recording data are sent to a recording unit to execute the recording.

The objects and features of the present invention will become more apparent from the consideration of the following detailed description taken in conjunction with the accompanying drawings.

BRIEF DESCRIPTION OF THE DRAWINGS

FIG. 2 schematically illustrates an arrangement of a recording unit of the facsimile apparatus shown in FIG. 1;

FIG. 3 is a view showing a recording area by one scan of a recording head;

FIG. 4 is a view showing a data arrangement of an image buffer 6;

DESCRIPTION OF THE PREFERRED EMBODIMENTS

Preferred embodiments of the present invention will be described in detail with reference to the accompanying drawings.

Figure 1:
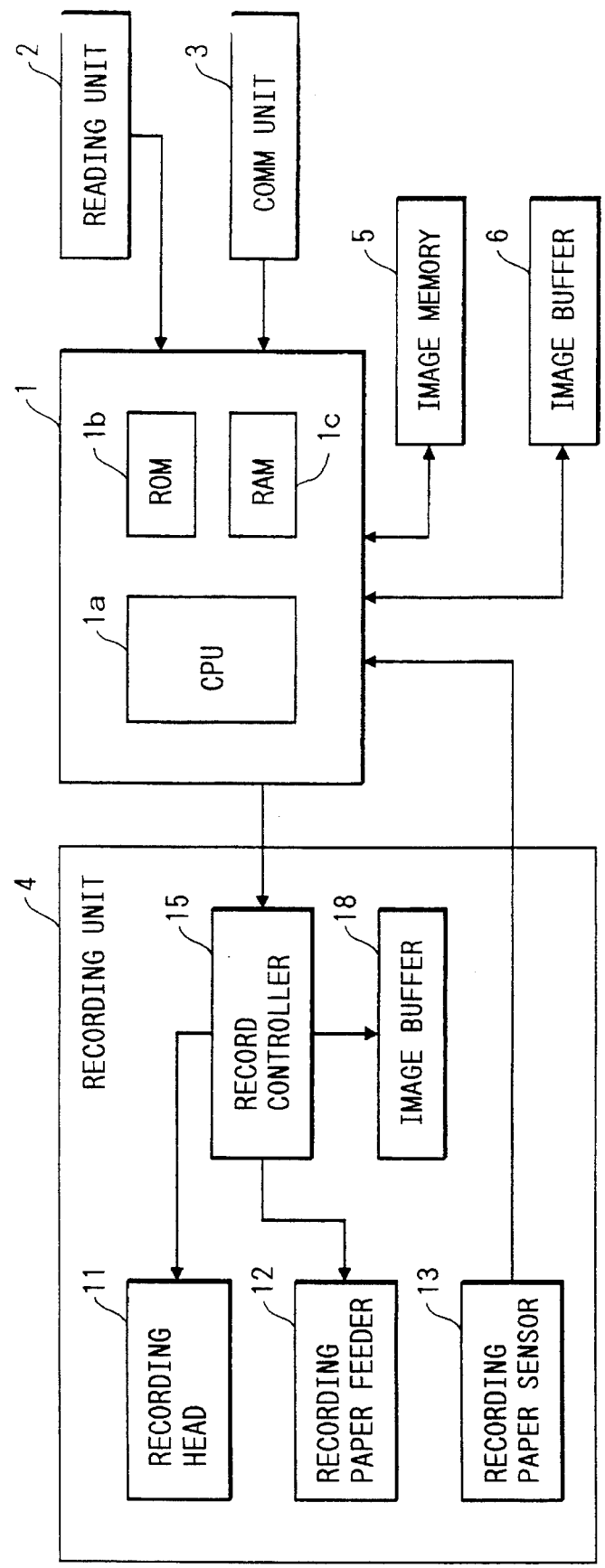
FIG. 1 is a block diagram showing schematically an arrangement of a facsimile apparatus according to an embodiment of the present invention.

FIG. 1 is a block diagram showing schematically an arrangement of a facsimile apparatus according to an embodiment of the present invention. Reference numeral 1 denotes a control unit for controlling an overall of the facsimile apparatus. The control unit 1 is provided with a CPU (Central Processing Unit) 1a, a ROM (Read Only Memory) 1b and a RAM (Random Access Memory) 1c. The CPU1a executes various control programs stored in the ROM1b to control the facsimile apparatus. The ROM1b stores a processing program also represented by a flow chart as described later. The RAM1c serves as a memory for temporarily storing data upon the execution of the processing by the CPU1a.

Reference numeral 2 denotes a reading unit which reads an original image and sends the read data to the control unit 1 as image data; 3 a communication unit, including modulator/demodulator circuits and a network control circuit, connected to a line to conduct transmission and reception of data to and from another facsimile apparatus or the like; 4 a recording unit for recording an image on a recording sheet; 5 an image memory for storing image data transmitted to or received from the communication unit; and 6 an image buffer for temporarily storing image data adapted to resolution faculty of the recording unit 4, which data are obtained by means of conversion of image data read out from the image memory 5.

Next, details of the recording unit 4 will be described with reference to FIGS. 2 and 3. FIG. 2 schematically illustrates an arrangement of a recording unit of the facsimile apparatus.

Reference numeral 11 denotes an ink jet scheme of recording head having nozzles for ink droplet ejection. Nozzles of 64 dots= line are arranged at a recording density of 360 dpi in a sub-scan direction (arrow A). The recording head 11 travels in a main scan direction (normal direction to a paper face of FIG. 2, or arrow B direction in FIG. 3) so that the recording is carried out at a recording density of 360 dpi×360 dpi. According to the present embodiment. By using heat energy generated from an electrothermal converting element provided for each of the nozzles to cause a state variation on,the ink, an ink droplet is ejected from the nozzle to form an image. Reference numeral 12 denotes a recording paper transport unit for feeding and discharging a recording paper 16. The recording paper transport unit 12 performs the paper feed with accuracy of 360 dpi in order to determine a position in the sub-scan direction upon recording by the recording unit 11. Reference numeral 13 denotes a recording paper sensor (PE sensor) for detecting the presence/absence of the recording paper, and a leading trailing edge of the recording paper. The PE sensor turns on if the recording paper is present, and it turns off if the recording paper is absent. Reference numeral 14 denotes a reflection type of photosensor for detecting a density on a recording surface of the recording paper; 15 a recording controller for controlling the recording head 11, the recording paper transport unit 12, the recording paper sensor 13 and the like in accordance with the control data transmitted from the CPU1a; 16 a recording paper, supplied in the form of a cut sheet, on which an image is recorded; and 18 an image buffer provided at the recording unit side for storing image data and a line feed command in units of scans.

Next, the recording area by the recording head 11 will be described. FIG. 3 is a view useful for understanding a recording area by one scan of the recording head 11. As shown in FIG. 3, the recording head 11 comprises 64 nozzles arranged in the sub-scan direction, so that 64 lines are recorded by one scanning operation. With regard to the main scan direction, 2880 dots are recorded by one scanning operation. Thus, by one scanning operation, an image of vertical 64 dots×horizontal 2880 dots is recorded at a recording density of 360 dpi.

Next, a data arrangement of the image buffer 6 will be described. FIG. 4 is a view useful for understanding a data arrangement of the image buffer 6. The image buffer 6 has a capacity corresponds to an area which the recording head 11 can draw by one scan in the main scan direction, that is, vertical 64 dots×horizontal 2880 dots. The image data of the image buffer may be read out in units of bytes (8 dots) by means of designating address ($A_{i,j}$). Thus, it will be understood that a line of image data consists of 360 bytes. By the use of the well known technology, the image data of the image buffer 6 are read out as $A_{0,0}$, $A_{1,0}$, $A_{63,0}$, $A_{0,1}$, $A_{1,1}$ . . . $A_{63,1}$ . . . . These data are converted into data to drive the recording head 11.

A recording operation of the facsimile apparatus provided with the arrangement as mentioned above will be explained hereinafter.

Figure 5:
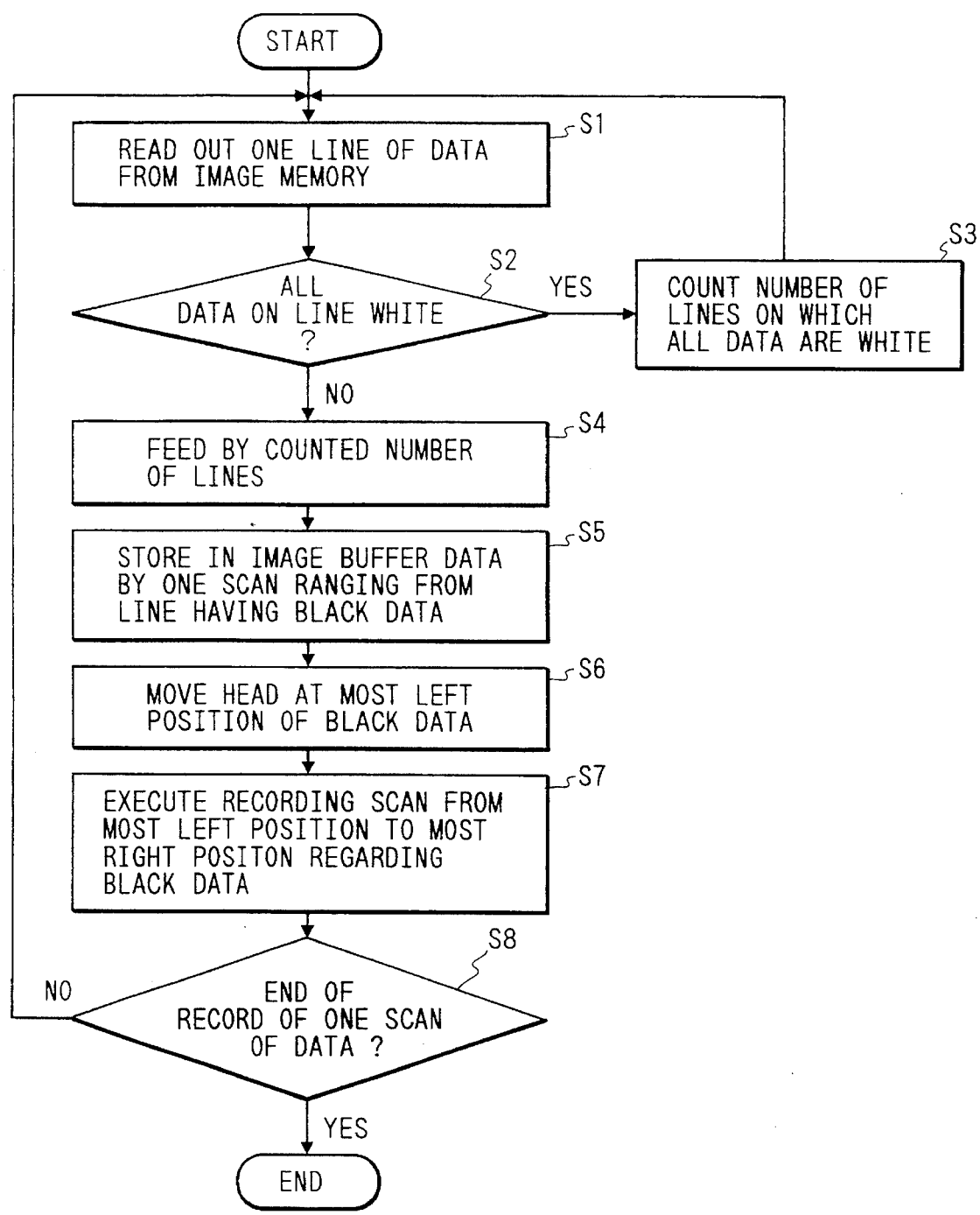
FIG. 5 is a flow chart showing a recording operation according to the present embodiment.

First, an outline of the recording operation according to the present embodiment will be described referring to FIGS. 5 and 6. FIG. 5 is a flow chart useful for understanding the recording operation according to the present embodiment, and FIG. 6 is a view useful for understanding an execution state of the recording operation.

A step S1 reads out a line of image data from the image memory 5. A step S2 determines whether all data of the line are white-information. If they are all white-information, the process goes to a step S3 in which the number of lines of white is counted, and then the process returns to the step S1. On the other hand, in the step S2, if it is determined that black-information exists, the process goes to a step S4. The step S4 feeds by the number of lines of white counted in the step S3. A step S5 reads out image data from the image memory and stores in the image buffer 6 64 lines (one scan) of image data ranging from a line having black-information.

When one scan of image data have been stored in the image buffer 6, the recording unit 4 initiates the recording processing. A step S6 moves the recording head 11 at the most left position of black-information in one scan of image data stored in the image buffer 6. A step S7 executes a recording scan up to the most right position of the black-information in the scan of image data stored in the image buffer 6. In this manner, when one scan of image data have been completely recorded, the process goes to a step S8 which determines whether the recording for image data of the image memory 5 has been completed. If it is not completed, the process returns to the step S1, and if completed, the recording operation is terminated.

Figure 6:
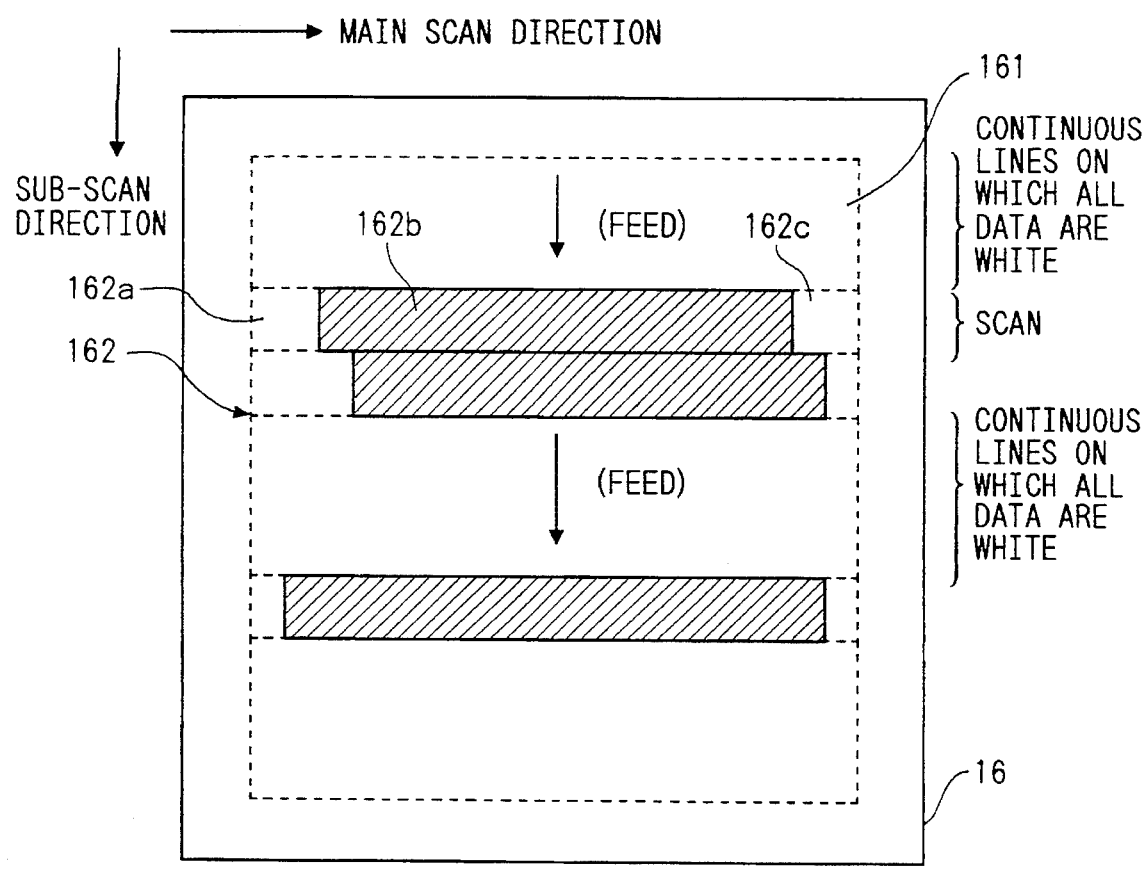
FIG. 6 is a view showing an execution state of the recording operation.

In accordance with the control as described above, the recording operation by the above mentioned recording unit 4 is as shown in FIG. 6. That is, an area 161 of continuous white lines is formed by feeding the recording paper 16. This avoids the necessity for the scan of the recording head for a white image, and thus reduces the processing time. With regard to an area 162 including black-information, first, the recording head 11 is moved at the most left position of black-information. That is, an area 162a is not subjected to the recording scan. The recording scan is executed only for an area 162b from the most left position of black-information to the most right position of black-information. Thus, for the right side area 162c also including no black-information, the recording head 11 is not scanned. In this manner, even in the recording processing of one scan, the recording scan is executed only for an area including black-information within a scan width, thereby reducing the recording processing time.

A method of implementing the recording operation as stated above will be described in details hereinafter.

Figure 7:
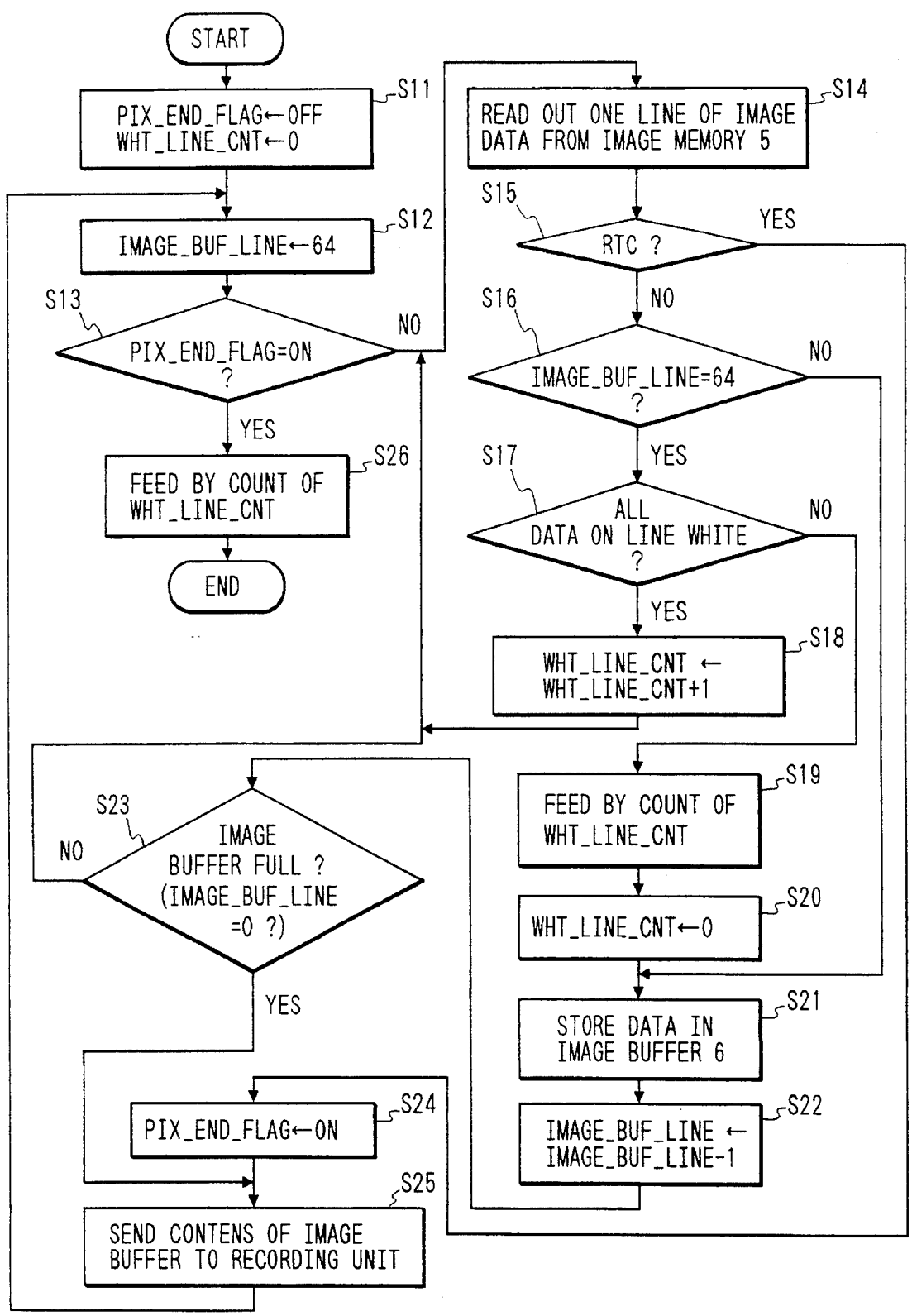
FIG. 7 is a flow chart showing a page recording processing for recording one page of an image stored in an image memory.

FIG. 7 is a flow chart useful for understanding a page recording processing for recording one page of an image stored in an image memory, in which the processing of step S1–S5 in FIG. 5 are described more in details. Those steps are executed by the CPU1a.

A step S11 sets OFF in a flag (PIX_END_FLAG) indicating the end of a page of image data, and initializes a white-line-counter (WHT_LINE_CNT) as zero.

A step S12 sets number 64 in a line counter (IMAGE_BUF_LINE) representative of the number of lines which are stored in the image buffer 6. In a step S13, if it is determined that the flag (PIX_END_FLAG) is ON, the process goes to a step S26 to feed by the count of the counter (WHT_LINE_CNT), and the processing is terminated. On the other hand, in the step S13, if the flag (PIX_END_FLAG) is not ON, the process goes to a step S14 in which a line of image data are read out from the image memory 5. According to the present embodiment, the image memory 5 stores MR encoded image data, and such image data are decoded and developed on lines. The facsimile image has a resolution of 8 pel/mm in a main scan direction, and a resolution of 3.85 line/mm (standard mode) or 7.7 line/mm (fine mode) in a sub-scan direction. Consequently, performed is resolution conversion to 360 dpi in both the main scan and sub-scan directions. Further, according to the present embodiment, a processing for removing an isolated pixel is also performed when a decoding process is executed. The isolated pixel is determined on the basis of an area of 3×3 pixels including a noticed pixel at the center. If the noticed pixel is black, and all of the adjacent 8 pixels are white, it is determined that the noticed pixel is isolated, and the noticed pixel is replaced by a white pixel. Since the decoding processing, the resolution conversion processing and the isolated pixel removing processing, as stated above, are well known, the detailed description is omitted.

If a step S15 detects the end of image (RTC), the process goes to a step S24 in which the flag (PIX_END_FLAG) is set as ON, and then to a step S25. On the other hand, if the step S15 does not detect the end of image (RTC), the process goes to a step S16. In the step S16, if the line counter (IMAGE_BUF_LINE) indicates the count value 64, which means that no line of data is stored in the image buffer 6, then the process goes to a step S17, and if at least one of line of data is stored, then the process goes to a step S21. In the step S17, if all of the lines read out are white, the process goes to a step S18 in which the counter (WHT_LINE_CNT) for counting the number of continuous lines each having white data throughout (or all-white lines) is incremented, and then returns to the step S14. If the step S17 does not detect any all-white line, a command to feed by the count of the counter (WHT_LINE_CNT) is sent to the recording control unit 15 (step S19), the counter (WHT_LINE_CNT) is cleared into zero (step S20), and the process goes to a step S21.

In the step S21, image data on the line read out are stored in the image buffer 6. In a step S22, the line counter (IMAGE_BUF_LINE) is decremented one by one, and as a result, when the line counter (IMAGE_BUF_LINE) indicates the count value 0, which means that the image buffer 6 fills with the data, the process goes from a step S23 to a step S25. In the step S25, the contents of the image buffer 6 are sent to the recording unit 4, and the process returns to the step S12. On the other hand, in the step S23, if the image buffer does not fill with data, the process returns to the step S14. In a step S25, image data are sent to the recording unit 4 to record one scan of image data. A send-out processing for the data in the step S25 will be described hereinafter.

Figure 8:
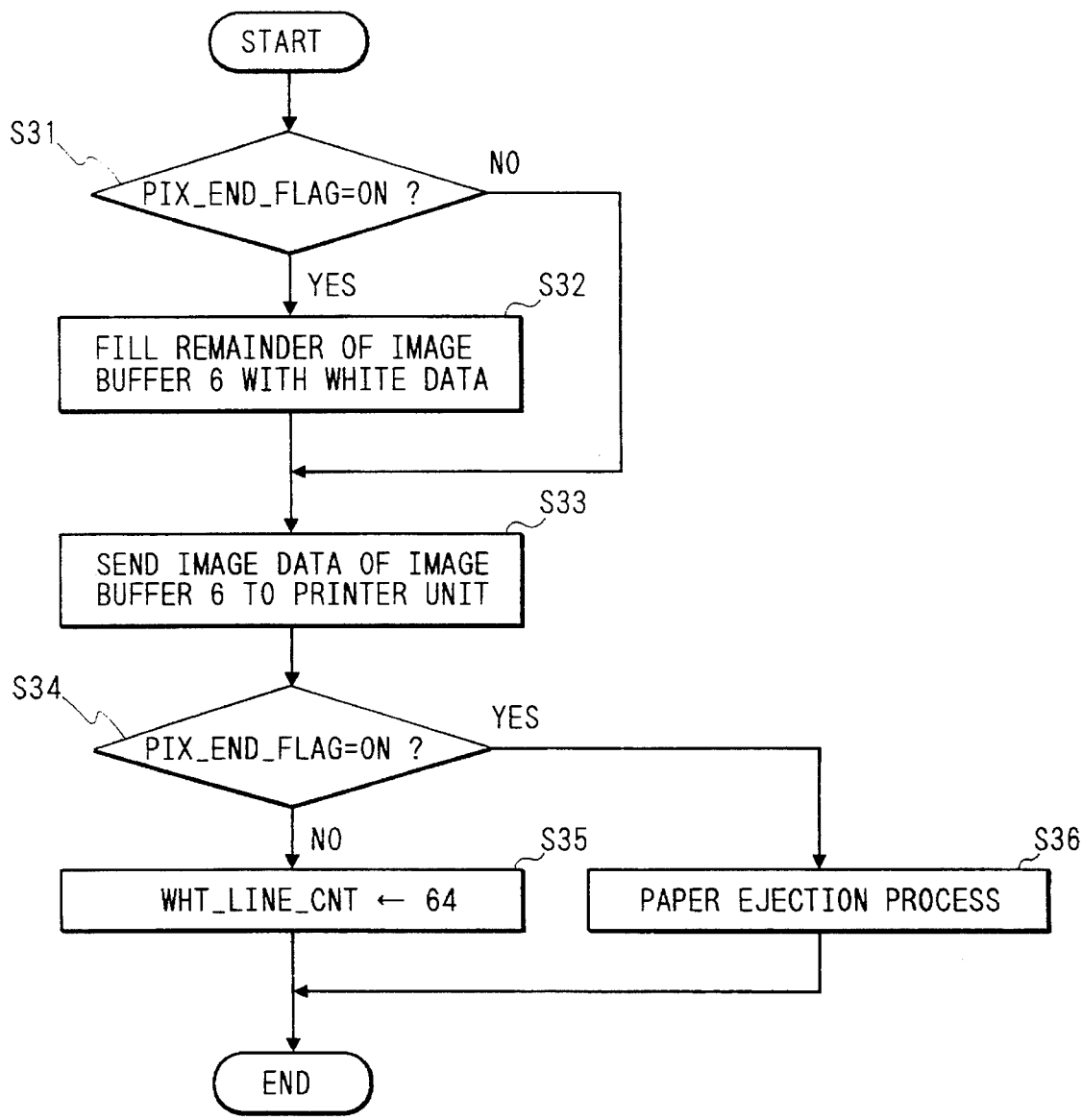
FIG. 8 is a flow chart showing a procedure for transmission of one scan of image data.

FIG. 8 is a flowchart useful for understanding a procedure (step S25) for transmission of one scan of image data.

In a step S31, if the flag (PIX_END_FLAG) is ON, that is, if the end of image is indicated, the remainder of the image buffer 6 is filled with white data (step S32), and then the process goes to a step S33. In a case where the step S15 detects the end of image (RTC), the process shifts to the data send-out processing (step S25), retaining the image buffer 6 unfilled with the image data, thus it is necessary for the step S32 to clear the remainder. On the other hand, in the step S31, if the flag (PIX_END_FLAG) is OFF, the process directly goes to the step S33.

The step S33 sends to the recording unit 4 the image data of vertical 64 dots×horizontal 2880 dots (vertical 64 bytes× horizontal 360 bytes) as read out through the image buffer 6. In a step S34, if the flag (PIX_END_FLAG) is ON, the step S36 performs a paper ejection process, and then the processing is terminated. On the other hand, in the step S34, if the flag (PIX_END_FLAG) is OFF, the step S35 sets the value 64 in the counter (WHT_LINE_CNT), and then the processing is terminated. Here, by setting the counter (WHT_LINE_CNT) without feeding by one scan, a usual line feed required after one scan of recording processing is contained in the feed (step S19) based on the count of the counter (WHT_LINE_CNT), whereby a smooth feed operation can be realized.

Figure 9:
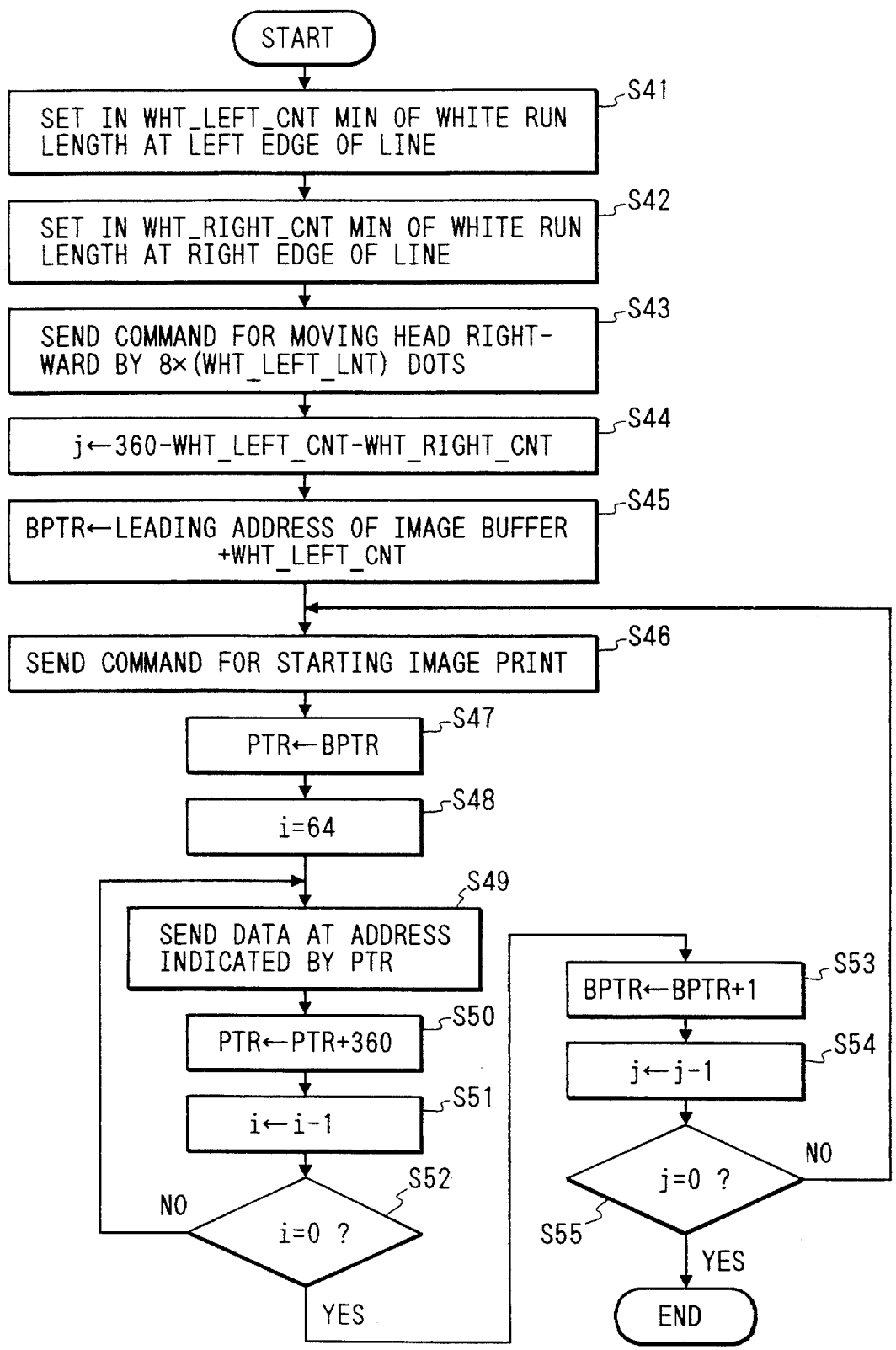
FIG. 9 is a flow chart showing details of the transmission processing for the image data, as shown in FIG. 8.

FIG. 9 is a flow chart showing details of the transmission processing for the image data as shown in the step S33 in FIG. 8.

A step S41 obtains the minimum value of white run length at the left edge of the respective line in the image buffer 6 and sets it in a counter (WHT_LINE_CNT). Likewise, a step S42 obtains the minimum of white run length at the right edge of the respective line and sets it in a counter (WHT_RIGHT_CNT). Regarding the processing for obtaining the minimum of white run length at the left edge and the minimum of white run length at the right edge, they will be described later. Both the counters (WHT_LEFT_CNT) and (WHT_RIGHT_CNT) are set in units of bytes.

A step S43 sends to the record control unit 15 of the recording unit 4 a command for moving the recording head 11 rightward by 8×the counter value of the counter (WHT_LEFT_CNT) from the left edge. In a step S44, a horizontal direction counter j is set to determine a recording width in the main scan direction. In a step S45, a base pointer BPTR is set to a leading address of the image buffer+ the counter value of the counter (WHT_LEFT_CNT), and the process goes to a step S46.

The step S46 sends an image recording start command to the record control unit 15 of the recording unit 4 to inform the recording unit 4 that data to be sent are image data. In step S47, the content of the base pointer BPTR is set in a work pointer PTR. In step S48, a vertical direction (sub-scan direction) of counter i is loaded with the counter value 64, and then the process goes to a step S49.

The step S49 sends data of addresses ($A_{i,j}$ in FIG. 4) indicated by the work pointer PTR to the recording unit 4. A step S50 advances the work pointer PTR to the next line. Since recording according to the present embodiment is performed with 2880 dots or 360 bytes in the main scan direction, the value 360 is added to the work pointer PTR. In a step S51, the counter i is decremented. If the counter i is not 0, the process returns to the step S49 (step S52). On the other hand, the counter i indicates the count value 0, the process goes to a step S53 in which the base pointer BPTR advances rightward by one byte. In a step S54, the horizontal direction counter j is decremented. Then, the counter i is not 0 in a step S55, the process returns to the step S46. If the counter j indicates the count value 0 in the step S55, the process is terminated.

Figure 10:
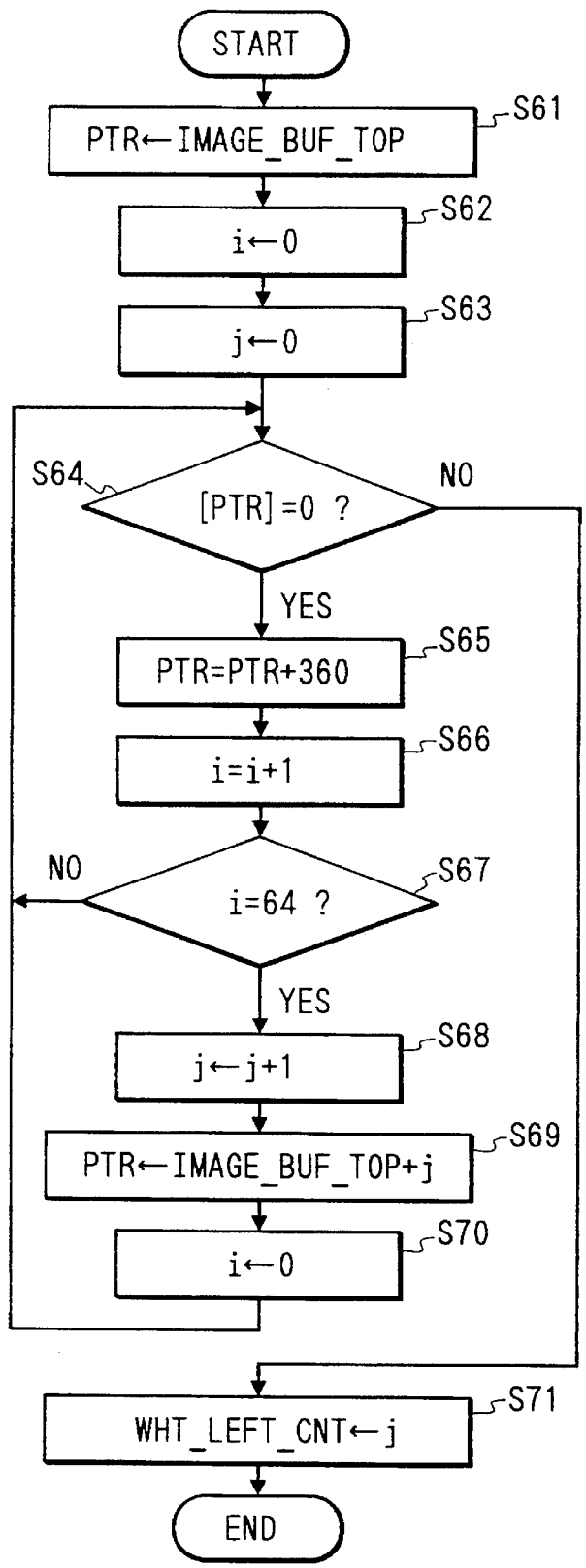
FIG. 10 is a flow chart showing details of the processing for obtaining a minimum value of a white run length at a left edge of a line, as shown in FIG. 9.

FIG. 10 is a flow chart showing details of the processing for obtaining the minimum value of white run length at the left edge of line as shown in the step S41 of FIG. 9.

First, the pointer PTR is set to the top address (IMAGE_BUF_TOP) of the image buffer 6 (step S61), and then horizontal direction (main scan direction) counter j and the vertical direction (sub-scan direction) counter i are set to 0 (step S62, step S63). Subsequently, it is determined whether data ([PTR]) of the address indicated by the pointer PTR is 0 (step S64). As a result, if it is not 0, the value of the counter j is set to the counter (WHT_LEFT_CNT) in a step S71, and then the process is terminated. According to this process, it is intended that in a case where data of the address of the image buffer 6 indicated by the pointer PTR include black-information, the recording scan is initiated from the position (indicated by the counter j).

Meanwhile, in the step S64, if data ([PTR]) of the address indicated by the pointer PTR is 0, 360 is added to the pointer PTR (step S65) and the pointer PTR indicates an address of data on the successive line downward (step S65). In the step S66, the counter i is incremented. If the counter i does not reach the count value 64, the process returns to the step S64 (step S67). This operation is repeated until the counter i reaches the count value 64. In the step S67, if the counter i indicates the count value 64, the counter j is incremented (step S68). In a step S69, the pointer PTR is set to an address which equals the top address (IMAGE__BUF__TOP) of the image buffer 6+ the count value j of the horizontal direction counter j. In a step S70, the vertical direction counter i is initialized, and the process returns to the step S64.

Figure 11:
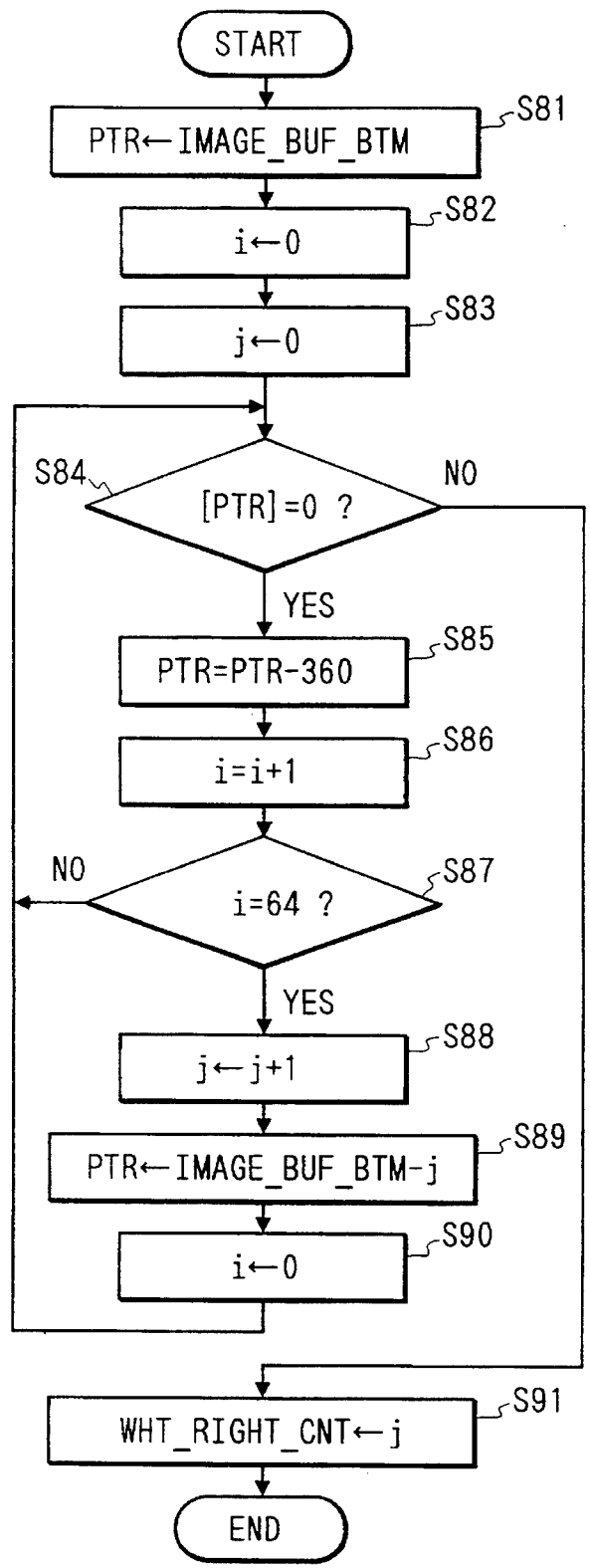
FIG. 11 is a flow chart showing details of the processing for obtaining a minimum value of a white run length at a right edge of a line, as shown in FIG. 9.

FIG. 11 is a flow chart showing details of the processing for obtaining the minimum value of white run length at the right edge of line as shown in the step S42 of FIG. 9.

First, the point PTR is set to a bottom address (IMAGE__BUF__BTM) of the image buffer 6 (step S81), and then the horizontal direction (main scan direction) counter j and the vertical direction (sub-scan direction) counter i are set to 0 (step S82, step S83). Subsequently, it is determined whether data ([PTR]) of the address indicated by the pointer PTR is 0 (step S84). As a result, if it is not 0, the value of the counter j is set to the counter (WHT__RIGHT__CNT) in a step S91, and then the process is terminated. Meanwhile, in the step S84, if data ([PTR]) of the address indicated by the pointer PTR is 0, 360 is subtracted from the pointer PTR and the pointer PTR indicates an address of data on the successive line downward (step S85). In the step S86, the counter i is incremented. If the counter i does not reach the count value 64, the process returns to the step S84 (step S87). This operation is repeated until the counter i reaches the count value 64. In the step S87, if the counter i indicates count value 64, the counter j is incremented (step S88). In the step S89, the pointer PTR is set to an address which equals the bottom address (IMAGE-BUF-BTM) of the image buffer 6—the count value j of the horizontal direction counter j. In the step S90, the vertical direction counter i is initialized, and the process returns to the step S84.

The above mentioned control permits the recording head to operate as described regarding FIG. 6.

According to the facsimile apparatus of the present embodiment as described above, when recording data are transferred to the recording unit 4, it is determined whether lines to be recorded are all-white lines, and the continuous all-white lines are not transferred in the form of image data, but the number of the continuous all-white lines is transferred in the form of a feed command. In a case where a line having in black information exists, lines of the number 64 equal to the number of dots of the recording head 11 from that line are transferred in the form of image data as they are. In this manner, by the number of the continuous all-white lines the feed process is executed, so that the amount of images to be processed in the recording unit 4 is reduced, thereby reducing time for the processing.

Further, according to the present embodiment, a minimum value of white run length at the left edge of the respective line of one scan of image data transmitted in the form of a printing position designation command to the printer. Thereafter, transferred to the recording unit is image data which is cut off at the most left black dot position in the sub-scan direction, and also cut off at the most right black dot position in the sub-scan direction. Such a process contributes to reducing a processing amount with regard to one scan of image data for a printer side, thereby reducing time for the processing.

Further, according to the present invention, it is possible to prevent the recording head from being operative to record unnecessary isolation points or the like on an image, because MR encoded image data are developed into image data after removing the isolation pixels, when the MR encoded image data are decoded.

The present invention is applicable to both a system comprising a plurality of equipments and a system comprising a single equipment. Of course, the present invention is applicable to such a situation that the invention is attained by means of supplying programs to systems or apparatuses.

The present invention is applicable to a facsimile apparatus using a different type of ink jet recording system, as a recording system, for example, a so-called piezo type of ink jet recording apparatus in which a piezoelectric element is used as an energy source for ink ejection. Particularly, according the recording head or the recording apparatus employing thermal energy to cause a state variation on ink, and the ink eject the ink from an orifice, accordingly, it is possible to provide the high-densification and high-definition recording.

The typical structure and operational principle of a recording apparatus of the ink jet system for performing recording by forming flying ink droplets by utilizing heat energy are preferably the ones disclosed for example in U.S. Pat. Nos. 4,723,129 and 4,740,796. This system is applicable to either a so-called on demand type recording system or a continuous type recording system. Particularly, this system is effectively applicable to the on-demand type system for the following reason. When at least one driving signal that corresponds to recording information, and can give abrupt temperature rise exceeding nuclear boiling is applied to an electrothermal converting element arranged in correspondence with a sheet or liquid channel, which holds an ink, the electrothermal converting element generates heat energy, the heat energy causes film boiling on a heat acting surface of a recording head, and consequently, a bubble can be formed in the liquid (ink) in one-to-one correspondence with the driving signal. Upon growth and contraction of this bubble, the liquid (ink) is ejected through an ejection orifice, thereby forming at least one droplet. It is more preferable to define this driving signal to have a pulse waveform since a bubble can grow and contract instantaneously, and in particular, the liquid (ink) can be ejected in a short response time. As the driving signal having the pulse waveform, signals disclosed in U.S. Pat. Nos. 4,463,359 and 4,345,262 are suitable. Further excellent recording can be realized when conditions disclosed in U.S. Pat. No. 4,313,124 of the invention associated with the temperature rise rate of the heat acting surface are adopted.

As the structure of the recording head, in addition to a structure (linear liquid channel or a right-angle liquid channel) as a combination of ejection orifices, liquid channels, and electrothermal converting elements disclosed in the above-mentioned specifications, structures disclosed in U.S. Pat. Nos. 4,558,333 and 4,459,600 disclosing a structure having a heat acting structure arranged in a flexed region may be used. In addition, the recording head may be arranged based on Japanese Laid-Open Patent Application No. 59-123670 that discloses a structure wherein a common slit is used as an ejection portion for a plurality of electrothermal converting elements, or Japanese Laid-Open Patent Application No. 59-138461 that discloses a structure wherein an opening for absorbing a pressure wave of heat energy is formed in correspondence with the ejection portion. Those structures make it possible to expect effective advantages of the present invention, since the use of any type of recording head permits the recording to be reliably and effectively performed.

Furthermore, the present invention is effectively applicable to a full-line type recording head having a length corresponding to the maximum width of a recording medium, which can be used in recording of a recording apparatus, either a structure which satisfies this length by combining a plurality of recording heads or a structure as an integrally formed single recording head may be employed. In addition, an exchangeable chip type recording head, which enables electrical connection to the apparatus main body or supply of ink from the apparatus main body being mounted onto the apparatus main body, or a cartridge type recording head, which has an ink tank provided integrally on the recording head itself, may be effectively used.

If is preferable to add a preliminary auxiliary means, and the like for the recording head since they can further stabilize the effect of the present invention. For example, it is also effective to provide preheating means which may comprise an electrothermal converting means, or another heating element, or a combination thereof.

Also regarding the sort of the recording head to be equipped and the number thereof, it may be so arrange for example to provide a single recording head corresponding to monochromatic ink or a plurality of recording heads each corresponding to the associated one of a plurality of kinds of ink mutually different in recording color and density.

The present invention is not limited to the particular embodiments described above. Various changes and modifications may be made within the spirit and scope of the invention.

What is claimed is:

1. An image recording apparatus for recording an image on a recording medium on the basis of image data comprising:

recording means for recording one or more line data on the recording medium through one time recording scan;

transfer means for transferring the recording medium;

data generating means for removing an isolation pixel on the basis of the image data and generating line data;

white area forming means for forming on the recording medium a white area constituted by single or continuous line data involved in only white information in such a way that when the white area exists, the recording medium is transferred by the number of associated lines corresponding by said transfer means;

recording data forming means for forming recording data on the basis of line data an amount of which is necessary for one time of recording scan of said recording means, said line data beginning with line data including black information; and recording control means for causing said recording means to carry out the recording scan on the basis of the recording data.

2. An image recording apparatus according to claim 1, further comprising start position detecting means for detecting as a scan start position a position of black information which appears first at a scan start side in the recording data formed by said recording data forming means, wherein recording control means causes said recording means to carry out the recording scan from the scan start position on the basis of the recording data.

3. An image recording apparatus according to claim 1, further comprising end position detecting means for detecting as a scan end position a position of black information which appears last at a scan end side in the recording data formed by said recording data forming means, wherein recording control means causes said recording means to carry out the recording scan on the basis of the recording data and to terminate the recording scan at the scan end position detected by said end position detecting means.

4. An image recording apparatus according to claim 1, further comprising receiving means for receiving image data transmitted from a sending party through a line, and storage means for storing the image data received by said receiving means, wherein said data generating means generates the line data on the basis of the image data stored in said storage means.

5. An image recording apparatus according to claim 4, wherein said storage means stores encoded image data.

6. An image recording apparatus according to claim 5, wherein said data generating means generates the line data in such a way that the encoded image data are decoded, and said data generating means further performs a process for removing an isolation pixel during the decoding process.

7. An image recording apparatus according to any of claims 1 to 6, wherein said recording means includes a recording head having one or more recording elements arranged, and moving means for moving said recording head in a recording scan direction, and said transfer means transfers the recording medium every recording scan in a direction substantially perpendicular to the recording scan direction.

8. An image recording apparatus according to claim 7, wherein said recording element ejects an ink droplet onto the recording medium to form an image.

9. An image recording apparatus according to claim 8, wherein said recording element ejects an ink droplet in such a way that thermal energy is used to induce a state variation on ink.

10. An image recording apparatus for recording a page of image on a recording medium using recording means for recording a predetermined amount of image by means of performing a recording scan on the basis of recording data, wherein a page of image is recorded on the recording medium in such a way that the predetermined amount of image is recorded plural number of times, said image recording apparatus comprising:

transfer means for relatively transferring said recording means and the recording medium after recording of the predetermined amount of image;

generating means for generating line recording data on the basis of image data, said generating means performing a process for removing an isolation pixel during the line recording data generating operation;

detecting means for detecting an area constituted by only white information on the basis of the line recording data generated by said generating means; and control means for controlling said transfer means to relatively transfer said recording means and the recording medium by the distance according to the area detected by said detecting means, without carrying out the recording scan by said recording means for the detected area.

11. An image recording apparatus according to claim 10, wherein said detecting means detects the area constituted by only white information by means of counting a number of continuous lines involved in only white information on the basis of the line recording data generated by said generating means.

12. An image recording apparatus according to claim 11, wherein said control means controls said transfer means to transfer the recording medium by the number of lines according to the counted value in a direction which is different from the recording scan direction.

13. An image recording apparatus according to claim 10, further comprising receiving means for receiving image data transmitted from a sending party through a line, and storage means for storing the image data received by said receiving means, wherein said data generating means generates the line data on the basis of the image data stored in said storage means.

14. An image recording apparatus according to claim 13, wherein said storage means stores encoded image data.

15. An image recording apparatus according to claim 14, wherein said data generating means generates the line recording data in such a way that the encoded image data are decoded, and said data generating means further performs a process for removing an isolation pixels during the decoding process.

16. An image recording apparatus according to any of claims 10 to 15, wherein said recording means includes a recording head having a plurality of recording elements arranged in a direction which is different from the recording scan direction, and said predetermined amount of image is recorded in such a way that said recording head is moved in the recording scan direction, while said plurality of recording elements are energized.

17. An image recording apparatus according to claim 16, wherein said recording head ejects an ink droplet to form an image.

18. An image recording apparatus according to claim 17, wherein said recording head ejects an ink droplet in such a way that thermal energy is used to induce a state variation on ink.

19. An image recording apparatus for recording a predetermined amount of image on a recording medium using a recording head having an arrangement of a plurality of recording elements, wherein said predetermined amount of image is recorded on the recording medium in such a way that said recording head is relatively moved to the recording medium in a direction which is different from an arrangement direction of said plurality of recording elements, so that a recording scan is carried out, said image recording apparatus comprising:

generating means for generating recording data on the basis of image data, said generating means performing a process for removing an isolation pixel during the recording data generating operation;

detecting means for detecting an area constituted by only white information on the basis of the recording data generated by said generating means, said white information being involved in a recording scan start side and/or a recording scan end side with regard to recording data corresponding to one time of recording scan; and control means for causing said recording head to carry out the recording scan for areas excepting the area detected by said detecting means.

20. An image recording apparatus according to claim 19, wherein said detecting means detects said area in accordance with a length of the white information involved in a recording scan start side and/or a recording scan end side with regard to recording data corresponding to one time of recording scan.

21. An image recording apparatus according to claim 20, wherein said control means provides such a control that the recording scan is initiated at a position according to a minimum value of the length of the white information involved in a recording scan start side and/or the recording scan is terminated at a position according to a minimum value of the length of the white information involved in a recording scan end side.

22. An image recording apparatus according to claim 19, further comprising receiving means for receiving image data transmitted from a sending party through a line, and storage means for storing the image data received by said receiving means, wherein said data generating means generates the line data on the basis of the image data stored in said storage means.

23. An image recording apparatus according to claim 22, wherein said storage means stores encoded image data.

24. An image recording apparatus according to claim 23, wherein said data generating means generates the line recording data in such a way that the encoded image data are decoded, and said data generating means further performs a process for removing an isolation pixel during the decoding process.

25. An image recording apparatus according to any of claims 19–24, wherein said recording head ejects an ink droplet to form an image.

26. An image recording apparatus according to claim 25, wherein said recording head ejects an ink droplet in such a way that thermal energy is used to induce a state variation on ink.

27. An image recording apparatus for recording an image on a recording medium using recording means for recording a predetermined amount of image by means of performing a recording scan on the basis of recording data, wherein a page of image is recorded on the recording medium in such a way that the predetermined amount of image is recorded a plural number of times, said image recording apparatus comprising:

transfer means for relatively transferring said recording means and the recording medium after recording of the predetermined amount of image;

generating means for generating recording data on the basis of image data, said generating means performing a process for removing an isolation pixel during the recording data generating operation;

detecting means for detecting an area constituted by only white information on the basis of the recording data generated by said generating means; and control means for controlling said transfer means to relatively transfer said recording means and the recording medium by a distance according to the area detected by said detecting means, without carrying out the recording scan by said recording means for the detected area.

28. An image recording apparatus according to claim 27, wherein said generating means generates line recording data, and said detecting means detects the area constituted by only white information by means of counting a number of continuous lines involved in only white information on the basis of the line recording data generated by said generating means.

29. An image recording apparatus according to claim 28, wherein said control means controls said transfer means to transfer the recording medium by the number of lines according to the counted value in a direction which is different from the recording scan direction.

30. An image recording apparatus according to claim 27, further comprising receiving means for receiving image data transmitted from a sending party through a line, and storage means for storing the image data received by said receiving means, wherein said data generating means generates the line data on the basis of the image data stored in said storage means.

31. An image recording apparatus according to claim 30, wherein said storage means stores encoded image data.

32. An image recording apparatus according to claim 31, wherein said data generating means generates the line recording data in such a way that the encoded image data are decoded, and said data generating means further performs a process for removing an isolation pixel during the decoding process.

33. An image recording apparatus according to any of claims 27 to 32, wherein said recording means includes a recording head having a plurality of recording elements arranged in a direction which is different from the recording scan direction, and said predetermined amount of image is recorded in such a way that said recording head is moved in the recording scan direction, while said plurality of recording elements are energized.

34. An image recording apparatus according to claim 33, wherein said recording head ejects an ink droplet to form an image.

35. An image recording apparatus according to claim 34, wherein said recording head ejects an ink droplet in such a way that thermal energy is used to induce a state variation on ink.

36. An image recording apparatus for recording an image on a recording medium using recording means for recording a predetermined amount of image by means of performing a recording scan on the basis of recording data, wherein a page of image is recorded on the recording medium in such a way that the predetermined amount of image is recorded a plural number of times, said image recording apparatus comprising:

generating means for generating recording data on the basis of image data, said generating means performing a process for removing an isolation pixel during the recording data generating operation;

detecting means for detecting an area constituted by only white information on the basis of the recording data generated by said generating means; and control means for causing said recording means to carry out the recording scan for areas excepting the area detected by said detecting means.

37. An apparatus according to claim 36, wherein said recording means includes a recording head having an arrangement of a plurality of recording elements, and carries out the recording scan by moving the recording head relatively to the recording medium in a direction different from an array direction of the recording elements.

38. An image recording apparatus according to claim 37, wherein said detecting means detects said area in accordance with a length of the white information involved in a recording scan start side and/or a recording scan end side with regard to recording data corresponding to one time of recording scan.

39. An image recording apparatus according to claim 38, wherein said control means provides such a control that the recording scan is initiated at a position according to a minimum value of the length of the white information involved in a recording scan start side and/or the recording scan is terminated at a position according to a minimum value of the length of the white information involved in a recording scan end side.

40. An image recording apparatus according to claim 37, further comprising receiving means for receiving image data transmitted from a sending party through a line, and storage means for storing the image data received by said receiving means, wherein said data generating means generates the line data on the basis of the image data stored in said storage means.

41. An image recording apparatus according to claim 40, wherein said storage means stores encoded image data.

42. An image recording apparatus according to claim 41, wherein said data generating means generates the line recording data in such a way that the encoded image data are decoded, and said data generating means further performs a process for removing an isolation pixel during the decoding process.

43. An image recording apparatus according to any of claims 37 to 42, wherein said recording head ejects an ink droplet to form an image.

44. An image recording apparatus according to claim 43, wherein said recording head ejects an ink droplet in such a way that thermal energy is used to induce a state variation on ink.

45. An image recording apparatus for recording an image on a recording medium, comprising:

input means for inputting image data;

generating means for generating recording data on the basis of image data input through said input means, said generating means performing a process for removing an isolation pixel during the recording data generating operation; and recording means for recording a predetermined amount of image on a recording medium by carrying out a recording scan, in accordance with the recording data generated from said generating means, said recording means recording one page of image on the recording medium by recording the predetermined amount of image plural times.

46. An apparatus according to claim 45, further comprising detecting means for detecting an area constituted by only white information on the basis of the recording data generated by said generating means and control means for causing said recording means to carry out the recording scan for areas excepting the area detected by said detecting means.

47. An apparatus according to claim 45, wherein said recording means includes a recording head having an arrangement of a plurality of recording elements, and carries out the recording scan by moving the recording head relatively to the recording medium in a direction different from an array direction of the recording elements.

48. An image recording apparatus according to claim 47, wherein said detecting means detects said area in accordance with a length of the white information involved in a recording scan start side and/or a recording scan end side with regard to recording data corresponding to one time of recording scan.

49. An image recording apparatus according to claim 48, wherein said control means provides such a control that the recording scan is initiated at a position according to a minimum value of the length of the white information involved in a recording scan start side and/or the recording scan is terminated at a position according to a minimum value of the length of the white information involved in a recording scan end side.

50. An image recording apparatus according to claim 45, wherein said input means includes receiving means for receiving image data transmitted from a sending party through a line, and storage means for storing the image data received by said receiving means, wherein said data generating means generates the line data on the basis of the image data stored in said storage means.

51. An image recording apparatus according to claim 50, wherein said storage means stores encoded image data.

52. An image recording apparatus according to claim 51, wherein said data generating means generates the line recording data in such a way that the encoded image data are decoded, and said data generating means further performs a process for removing an isolation pixel during the decoding process.

53. An image recording apparatus according to any of claims 45 to 52, wherein said recording head ejects an ink droplet to form an image.

54. An image recording apparatus according to claim 53, wherein said recording head ejects an ink droplet in such a way that thermal energy is used to induce a state variation on ink.

55. An image recording apparatus according to claim 45, further comprising transfer means for relatively transferring said recording means and the recording medium, detecting means for detecting an area constituted by only white information on the basis of the recording data generated by said generating means, and control means for controlling said transfer means to relatively transfer said recording means and the recording medium by the distance according to the area detected by said detecting means, without carrying out the recording scan by said recording means for the detected area.

56. An image recording apparatus according to claim 55, wherein said generating means generates line recording data, and said detecting means detects the area constituted by only white information by means of counting a number of continuous lines involved in only white information on the basis of the line recording data generated by said generating means.

* * * * *

UNITED STATES PATENT AND TRADEMARK OFFICE
CERTIFICATE OF CORRECTION

PATENT NO. : 5,485,285
DATED : January 16, 1996
INVENTOR(S) : SHUNICHI TACHIBANA It is certified that error appears in the above-identified patent and that said Letters Patent is hereby corrected as shown below:

On the title page, column 2, item [57] ABSTRACT

Line 2, "store" should read --stores--.
    Line 7, "line" should read --lines--.
    Line 10, "top" should read --on top--.

SHEET 5 OF 9

FIG. 7, "CONTENS" should read --CONTENTS--.

COLUMN 1

Line 12, "at" should read --an--.

COLUMN 3

Line 14, "embodiment. By" should read --embodiment, by--.
    Line 17, "on, the" should read --on the--.
    Line 51, "capacity" should read --capacity which--.

COLUMN 4

Line 15, "have" should read --has--.

COLUMN 8

Line 36, "nuclear" should read --nucleate--.

UNITED STATES PATENT AND TRADEMARK OFFICE
CERTIFICATE OF CORRECTION

PATENT NO. : 5,485,285
DATED : January 16, 1996
INVENTOR(S) : SHUNICHI TACHIBANA Page 2 of 2

It is certified that error appears in the above-identified patent and that said Letters Patent is hereby corrected as shown below:

COLUMN 9

Line 21, "If" should read --It--.
    Line 28, "arrange" should read --arranged--.

COLUMN 11

Line 21, "pixels" should read --pixel--.

Signed and Sealed this

Twenty-ninth Day of October 1996

Attest:

BRUCE LEHMAN

*Attesting Officer*    *Commissioner of Patents and Trademarks*